UNITED STATES PATENT OFFICE.

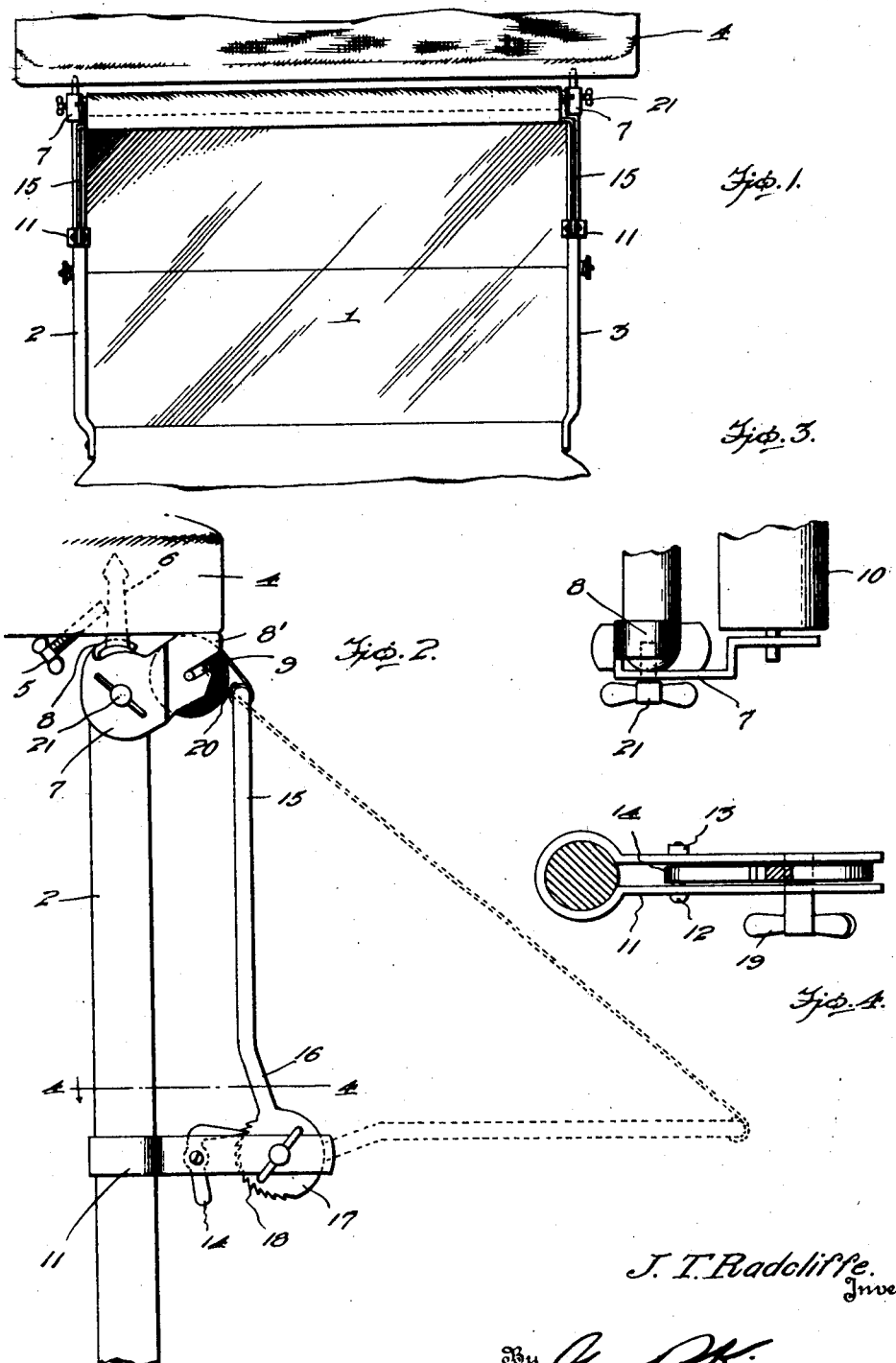

JOHN T. RADCLIFFE, OF BROOKLYN, NEW YORK.

ADJUSTABLE WIND-SHIELD PROTECTOR.

1,332,753.   Specification of Letters Patent.   Patented Mar. 2, 1920.

Application filed January 22, 1917. Serial No. 143,676.

*To all whom it may concern:*

Be it known that I, JOHN T. RADCLIFFE, a citizen of the United States, and resident of Brooklyn, in the county of Kings and State of New York, have invented certain new and useful Improvements in Adjustable Wind-Shield Protectors, of which the following is a specification.

The present invention relates to adjustable wind shield protectors and has particular reference to new and useful improvements in a roller curtain attachment detachably associated therewith.

The primary object of my invention is to provide a device of the class mentioned adapted to prevent rain and sleet from striking the upper section of the wind shield and thus preventing the same from being transparent.

Another object of my invention is to provide a device of the class mentioned adapted to prevent the sun from glaring directly into the eyes of the operator of a machine.

Among the aims and objects of the invention may also be recited, the provision of a wind shield protector of the character mentioned with a view to compactness, and in which the number of parts are few, the construction simple, the cost of production small, and efficiency and operation high.

Other improvements and novel details in the construction and arrangement of the various parts of the apparatus will be brought out more in detail in the description to follow, which, for a clear understanding of the invention, should be considered in connection with the accompanying drawing, forming a part hereof, and wherein is disclosed, for the purpose of illustration, convenient and satisfactory embodiments of the invention. It is to be noted, in this connection, that minor changes in the construction and arrangement of the parts may be made without departing from the spirit and scope of the invention or the principle of operation of the various parts. I desire to lay particular stress upon the fact that only one particular form of wind shield is herein shown and that my device may be associated to accommodate any of the common forms of wind shields now in use.

In the drawings:

Figure 1 is a front elevation of my invention;

Fig. 2 is a side elevation of the same;

Fig. 3 is a top plan view of the curtain bracket showing the same attached to a wind shield, and Fig. 4 is a horizontal sectional view taken on the line 4—4 of Fig. 2.

Referring now more particularly to the drawing, wherein like reference characters designate corresponding parts throughout the several views thereof, 1 designates the common form of wind shield having the supporting standards 2 and 3. The top of the machine in this instance is designated 4 having the thumb-screw 5 diagonally associated therewith for limiting the movement of the upper section of the wind shield shown in dotted lines and designated 6 in Fig. 2.

The roller curtain supporting bracket comprises a strap of metal including a body portion 7 having an extension 8 thereon for engagement with the upper portion of the wind shield 1. A projection 8' is formed on the opposite side of the body portion of the bracket having a longitudinal slot 9 therein to receive the lugs on the end of the curtain roller 10. An aperture is provided centrally of the body portion 7 to receive the winged screw 21 which engages openings in the standards to retain the brackets in the desired rigid position.

Intermediate the ends of the standards 2 and 3 I provide a bracket designated 11 in its entirety which is looped intermediate its end for receiving the standards and is retained thereon by means of the bolts 12, and nuts 13 having a pawl 14 pivotally associated therewith intermediate the sides thereof for a purpose which will hereinafter appear. A U-shaped frame designated 15 has an offset portion 16 on the ends thereof, the free ends of which are provided with a circular enlargement 17. The said enlargements are provided with a plurality of serrated teeth members 18 adapted to receive the free end of the pawl 14 to retain the U-shaped frame in any desired position. It is of course to be understood that an opening is provided in the said enlargement through which the thumb screw 19 is connected for retaining the U-shaped frame in the desired position. It is of course obvious that this thumb screw 19 acts in conjunction with the pawl 14. The curtain 10 has the free ends thereof connected to the upper portion of the frame 15 by means of lugs 20.

As best shown in Fig. 2 in dotted lines the device may be extended until the U-shaped frame is in the same plane with the bracket 11 thus preventing any rain, sleet or the like from striking the upper section of the wind shield.

It is of course obvious that in the operation of the invention a sufficiently strong spring is mounted within the roller 10 to provide a strong tension against the frame 15 having a tendency to draw the same up to close proximity with the roller.

It will be understood that the above description and accompanying drawing comprehend only the general embodiments of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent is:

An attachment of the character described, comprising a pair of brackets, each formed to provide spaced parallel arms and circular portions connecting the same for embracing the side standards of a wind shield, a pawl between the said arms, a pivot connecting the pawl between the arms and clamping the circular portions of the brackets about the standards, an inverted substantially U-shaped swinging frame having circular ends pivoted between the extremities of the arms and provided with ratchet teeth to be engaged by the pawls, bearings detachably hung upon the upper ends of the side standards to be disposed elevated relative to the brackets, means for removably securing the bearings to the standards and an extensible curtain connected with the swinging frame and having a roller supported in said bearings for the winding of said curtain thereon and the unwinding thereof from the same.

In testimony whereof, I affix my signature hereto.

JOHN T. RADCLIFFE.